United States Patent
Islam et al.

(10) Patent No.: US 10,004,032 B2
(45) Date of Patent: Jun. 19, 2018

(54) RESOURCE PARTITIONING IN MILLIMETER WAVE NETWORKS

(71) Applicant: QUALCOMM Incorporated, San Diego, CA (US)

(72) Inventors: Muhammad Nazmul Islam, Edison, NJ (US); Sundar Subramanian, Bridgewater, NJ (US); Ashwin Sampath, Skillman, NJ (US); Junyi Li, Chester, NJ (US); Zhenliang Zhang, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 14/843,345

(22) Filed: Sep. 2, 2015

(65) Prior Publication Data

US 2016/0269097 A1    Sep. 15, 2016

Related U.S. Application Data

(60) Provisional application No. 62/132,624, filed on Mar. 13, 2015.

(51) Int. Cl.
*H04W 48/16* (2009.01)
*H04W 28/26* (2009.01)
(Continued)

(52) U.S. Cl.
CPC .......... *H04W 48/16* (2013.01); *H04W 24/02* (2013.01); *H04W 28/26* (2013.01); *H04W 76/02* (2013.01);
(Continued)

(58) Field of Classification Search
CPC .... H04B 7/15507; H04L 12/46; H04W 48/16; H04W 74/002
See application file for complete search history.

(56) References Cited

U.S. PATENT DOCUMENTS 8,862,144 B2    10/2014  Sayadi et al.
9,326,183 B2 *   4/2016  Stanwood ............ H04J 11/0056
(Continued)

FOREIGN PATENT DOCUMENTS

WO    WO-2013086410 A2    6/2013
WO    WO-2013170169 A2    11/2013
(Continued)

OTHER PUBLICATIONS

ISA/EPO, International Search Report and Written Opinion of the International Searching Authority, Int'l App. No. PCT/US2016/018663, Jun. 6, 2016, European Patent Office, Rijswijk, NL, 12 pgs.

*Primary Examiner* — Muthuswamy Manoharan
(74) *Attorney, Agent, or Firm* — Clint R. Morin; Holland & Hart

(57) ABSTRACT

Techniques are described for backhaul operations in a millimeter wave wireless communication system. A first base station of the millimeter wave wireless communication system identifies an access demand and one or more access communication parameters associated with the first base station. The first base station sends information to a second base station indicative of the access demand and the one or more access communication parameters, and determines one or more backhaul communication parameters associated with the second base station of the millimeter wave wireless communication system. The first base station establishes a wireless backhaul link with the second base station via the millimeter wave wireless communication system. The first base station partitions resources between an access link with one or more user equipments and the established wireless backhaul link based at least in part on the access demand, the one or more access communication parameters, or the backhaul communication parameters.

30 Claims, 10 Drawing Sheets

(51) Int. Cl.
  *H04W 24/02* (2009.01)
  *H04W 76/10* (2018.01)
  *H04W 76/02* (2009.01)
  *H04W 84/18* (2009.01)
  *H04W 92/12* (2009.01)

(52) U.S. Cl.
  CPC ............ *H04W 76/10* (2018.02); *H04W 84/18* (2013.01); *H04W 92/12* (2013.01)

(56) References Cited

U.S. PATENT DOCUMENTS

| | | |
|---|---|---|
| 2013/0142136 A1 | 6/2013 | Pi et al. |
| 2013/0310052 A1 | 11/2013 | Timus et al. |
| 2015/0004918 A1 | 1/2015 | Wang et al. |
| 2015/0109943 A1* | 4/2015 | Sahin .................... H04W 48/16 370/252 |
| 2016/0044665 A1* | 2/2016 | Novlan ............. H04W 72/0446 370/336 |
| 2016/0309490 A1* | 10/2016 | Huang .................. H04W 48/08 |

FOREIGN PATENT DOCUMENTS

| | | |
|---|---|---|
| WO | WO-2014124164 A1 | 8/2014 |
| WO | WO-2015010296 A1 | 1/2015 |

\* cited by examiner

RESOURCE PARTITIONING IN MILLIMETER WAVE NETWORKS

CROSS REFERENCES

The present application for patent claims priority to U.S. Provisional Patent Application No. 62/132,624 by Islam et al., entitled "Resource Partitioning in Millimeter Wave Networks," filed Mar. 13, 2015, assigned to the assignee hereof, and expressly incorporated by reference herein.

BACKGROUND

Field of the Disclosure

The present disclosure, for example, relates to wireless communication systems, and more particularly to resource partitioning functions for backhaul operations in a millimeter wave wireless communication system.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station). A base station may communicate, either directly or indirectly with other base stations over backhaul links.

Base stations operating in the millimeter wave (mmW) frequency ranges, e.g., 28 GHz, 40 GHz, 60 GHz, etc., may be associated with a reduced coverage area (e.g., a smaller geographic footprint, directional transmissions only, etc.), which may result in deployment of a much larger number of base stations to provide acceptable coverage areas. Such large-scale mmW base station deployments may impact the quality and availability of links to a network entity. For example, some mmW base stations may be deployed in areas with limited bandwidth links to a network entity and, in some examples, no links to a network entity. In a conventional cellular communication system, base stations may rely on a wired connection to a network entity and, therefore, may not typically perform discovery over the wireless medium. In a mmW wireless communication system that includes base stations having limited or no connectivity to a network entity, backhaul operations may rely more on direct backhaul wireless communication links between mmW base stations. However, such backhaul operations may require a coordination of resources that satisfies the backhaul operational requirements and yet ensures adequate resources are available for communicating with UEs, e.g., for meeting access requirements. Moreover, such wireless backhaul operations may provide a more beneficial deployment scheme for a dense population of mmW base stations, e.g., provide a lower cost and more feasible option to installing fiber optic communication lines to each mmW base station.

SUMMARY

The described features generally relate to one or more improved systems, methods, and/or apparatuses for resource provisioning and coordination for backhaul operations in a mmW wireless communication system. Certain aspects of the present description employ various approaches for a mmW base station to identify an access demand and coordinate resources for performing the backhaul operations. For example, a first mmW base station may identify or otherwise determine an access demand to perform various backhaul operations. The first mmW base station may determine access and backhaul communication parameters for a second mmW base station based on the access demand. For example, the access and backhaul communication parameters may include attributes sufficient for performing the backhaul operations, e.g., backhaul demand, required access time, link gain between neighboring mmW base stations, etc. The first mmW base station may establish a backhaul link with the second mmW base station based on the access demand, the access communication parameters, or the backhaul communication parameters. The backhaul link may be a wireless link established over the mmW wireless communication system. The first mmW base station may partition resources between an access link with UEs and the established wireless backhaul link based on the access demand, the access communication parameters, or the backhaul communication parameters. The first mmW base station may conduct the backhaul operations via the second mmW base station over the mmW wireless communication system.

In some aspects, the described techniques provide an integrated solution for resource partitioning that satisfies the access demand (e.g., based on a backhaul communication requirement) of the mmW base station as well as meets access needs for UEs operating on the mmW wireless communication system. For example, certain time slots may be partitioned for access operations, e.g., access operations by UEs as well as neighboring mmW base stations, and other time slots may be partitioned for backhaul operations by other neighboring mmW base stations.

In a first set of illustrative examples, a method for wireless communication in a millimeter wave wireless communication system is provided. The method may include identifying, by a first base station of the millimeter wave wireless communication system, an access demand and one or more access communication parameters associated with the first base station of the millimeter wave wireless communication system, the one or more access communication parameters based at least in part on the access demand. Information indicative of the access demand and the one or more access communication parameters may be sent to a second base station. The first base station may determine one or more backhaul communication parameters associated with the second base station of the millimeter wave wireless communication system based at least in part on the access demand. The first base station may establish a wireless backhaul link with the second base station via the millimeter wave wireless communication system, the wireless backhaul link based at least in part on the access demand, the one or more access communication parameters, or the one or more backhaul communication parameters. The first base station may partition resources between an access link with one or more user equipments (UEs) and the established wireless backhaul link based at least in part on the access demand, the one or more access communication parameters, or the one or more backhaul communication parameters.

In some examples, the method may include identifying a network entity in communication with the first base station and the second base station; and receiving information from the network entity indicative of at least one of the one or more backhaul communication parameters. The method may include sending information to the network entity indicative of the access demand, wherein the information received from the network entity indicative of at least one of the one or more backhaul communication parameters is based at least in part on the access demand. The method may include receiving information from the network entity indicative of the at least one of the one or more backhaul communication parameters on a periodic schedule. The network entity may be connected to the first base station and the second base station via a wired communication link. The network entity may be connected to the first base station and the second base station via a wireless communication link associated with a third base station of the millimeter wave wireless communication system.

In some examples, the one or more access communication parameters may include at least one of a timeslot associated with the wireless access link, or a time frequency block associated with the wireless access link, or combinations thereof. In some examples, the one or more backhaul communication parameters may include a timeslot associated with the wireless backhaul link, or a time frequency block associated with the wireless backhaul link, or a beamforming parameter associated with the wireless backhaul link, or a modulation-and-coding scheme (MCS) associated with the wireless backhaul link, or combinations thereof. The method may include sending information indicative of the access demand to the second base station wirelessly via the millimeter wave wireless communication system; and receiving information from the second base station indicative of at least one of the one or more backhaul communication parameters.

In some examples, the method may include sending information indicative of the access demand to a third base station of the millimeter wave wireless communication system; and receiving, from the third base station, information indicative of at least one of the one or more backhaul communication parameters associated with the second base station. The method may include receiving a first message from the second base station conveying an indication of a second base station access demand; and sending a second message to the second base station conveying an indication of one or more communication parameters associated with the first base station. The method may also include establishing a wireless backhaul link with the second base station based at least in part on the one or more communication parameters associated with the first base station.

In some examples, the method may include identifying initial signaling schemes between the first base station and the second base station. The initial signaling schemes may comprise a sequence of transmit, receive (TX, RX) and receive, transmit (RX, TX) pairs in consecutive frames. The (TX, RX) pair may represent a timeslot for transmitting information associated with a state of the first base station followed by a slot for receiving information from additional base stations. The method may include creating pattern tables of one or more schedules associated with the initial signaling schemes; and using the pattern tables to determine a schedule to achieve low latency.

In a second set of illustrative examples, a first base station for wireless communication is provided. The first base station may include: a processor; memory in electronic communication with the processor; and instructions stored in the memory, the instructions being executable by the processor to: identify, by the first base station of a millimeter wave wireless communication system, an access demand and one or more access communication parameters associated with the first base station of the millimeter wave wireless communication system, the one or more access communication parameters based at least in part on the access demand, send information to a second base station indicative of the access demand and the one or more access communication parameters, determine, by the first base station, one or more backhaul communication parameters associated with the second base station of the millimeter wave wireless communication system based at least in part on the access demand, establish, by the first base station, a wireless backhaul link with the second base station via the millimeter wave wireless communication system, the wireless backhaul link based at least in part on the access demand, the one or more access communication parameters, or the one or more backhaul communication parameters, and partition, by the first base station, resources between an access link with one or more user equipments (UEs) and the established wireless backhaul link based at least in part on the access demand, the one or more access communication parameters, or the one or more backhaul communication parameters.

In some examples, the first base station may include instructions executable by the processor to: identify a network entity in communication with the first base station and the second base station; and receive information from the network entity indicative of at least one of the one or more backhaul communication parameters. The first base station may include instructions executable by the processor to: send information to the network entity indicative of the access demand, wherein the information received from the network entity indicative of at least one of the one or more backhaul communication parameters is based at least in part on the access demand.

In some examples, the first base station may include instructions executable by the processor to receive information from the network entity indicative of the at least one of the one or more backhaul communication parameters on a periodic schedule. The network entity may be connected to the first base station and the second base station via a wired communication link. The network entity may be connected to the first base station and the second base station via a wireless communication link associated with a third base station of the millimeter wave wireless communication system.

In some examples, the one or more access communication parameters comprises at least one of a timeslot associated with the wireless access link, or a time frequency block associated with the wireless access link, or combinations thereof. In some examples, the one or more backhaul communication parameters comprises at least one of a timeslot associated with the wireless backhaul link, or a time frequency block associated with the wireless backhaul link, or a beamforming parameter associated with the wireless backhaul link, or a modulation-and-coding scheme (MCS) associated with the wireless backhaul link, or combinations thereof.

In some examples, the first base station may include instructions executable by the processor to: send information indicative of the access demand to the second base station wirelessly via the millimeter wave wireless communication system; and receive information from the second base station indicative of at least one of the one or more backhaul communication parameters. The first base station may include instructions executable by the processor to: send information indicative of the access demand to a third base station of the millimeter wave wireless communication system; and receive, from the third base station, information indicative of at least one of the one or more backhaul communication parameters associated with the second base station.

In a third set of illustrative examples, a first base station for wireless communication is provided. The first base station may include: means for identifying, by the first base station of a millimeter wave wireless communication system, an access demand and one or more access communication parameters associated with the first base station of the millimeter wave wireless communication system, the one or more access communication parameters based at least in part on the access demand, means for sending information to a second base station indicative of the access demand and the one or more access communication parameters, means for determining, by the first base station, one or more backhaul communication parameters associated with the second base station of the millimeter wave wireless communication system based at least in part on the access demand, means for establishing, by the first base station, a wireless backhaul link with the second base station via the millimeter wave wireless communication system, the wireless backhaul link based at least in part on the access demand, the one or more access communication parameters, or the one or more backhaul communication parameters, and means for partitioning, by the first base station, resources between an access link with one or more user equipments (UEs) and the established wireless backhaul link based at least in part on the access demand, the one or more access communication parameters, or the one or more backhaul communication parameters.

In a fourth set of illustrative examples, a non-transitory computer-readable medium storing computer-executable code for wireless communication is provided, the code executable by a processor to: identify, by a first base station of a millimeter wave wireless communication system, an access demand and one or more access communication parameters associated with the first base station of the millimeter wave wireless communication system, the one or more access communication parameters based at least in part on the access demand, send information to a second base station indicative of the access demand and the one or more access communication parameters, determine, by the first base station, one or more backhaul communication parameters associated with the second base station of the millimeter wave wireless communication system based at least in part on the access demand, establish, by the first base station, a wireless backhaul link with the second base station via the millimeter wave wireless communication system, the wireless backhaul link based at least in part on the access demand, the one or more access communication parameters, or the one or more backhaul communication parameters, and partition, by the first base station, resources between an access link with one or more user equipments (UEs) and the established wireless backhaul link based at least in part on the access demand, the one or more access communication parameters, or the one or more backhaul communication parameters.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
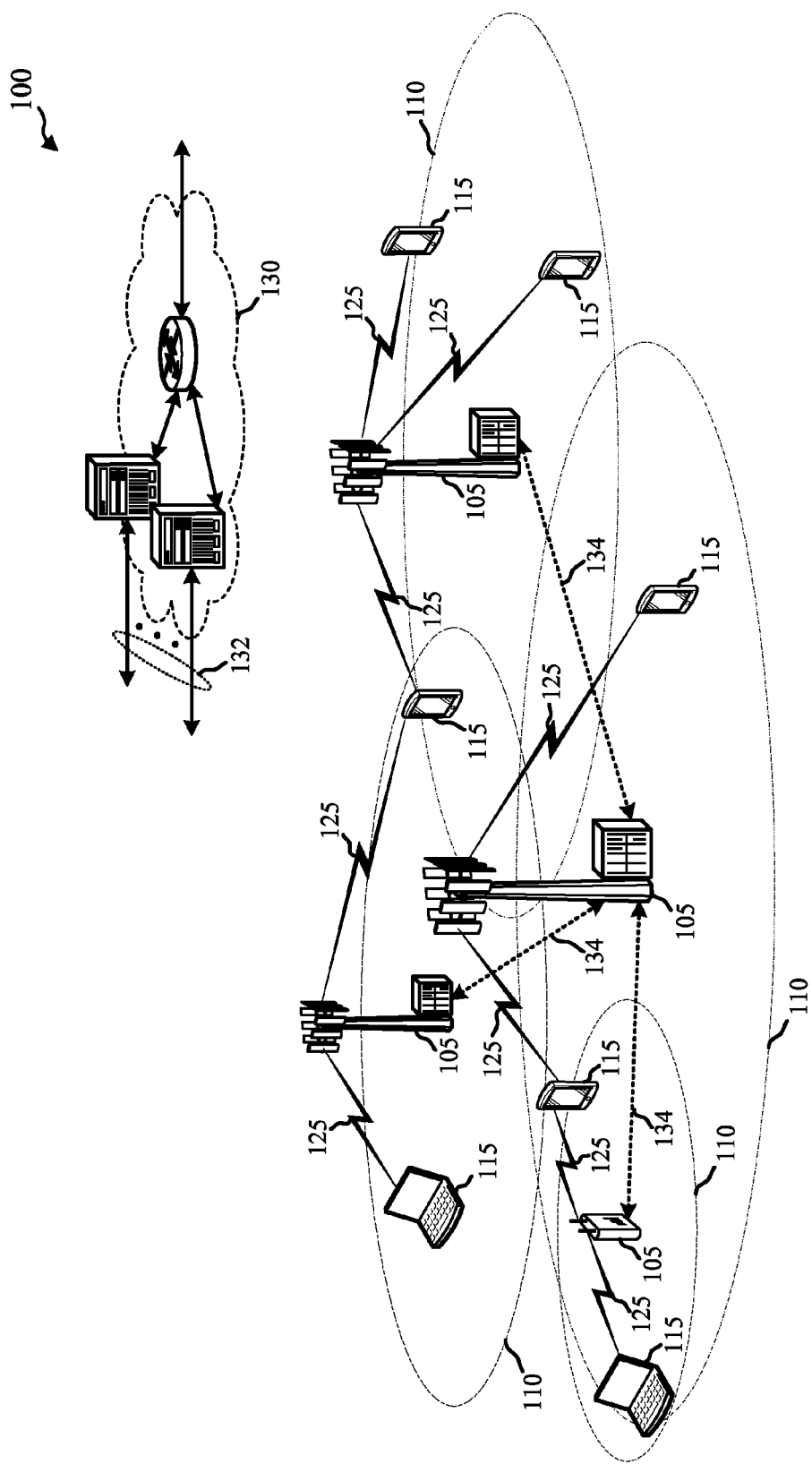
FIG. 1 shows a block diagram of a wireless communication system, in accordance with various aspects of the present disclosure.

Next generation cellular communication systems may utilize mmW wireless communication channels. Such mmW communication channels may involve using frequencies in the 20+ GHz range, which requires additional considerations in the development and deployment of the infrastructure components. For example, mmW wireless links tend to have a smaller geographic coverage area and often require use of directional transmissions. In order to provide wide scale coverage, a more dense population of mmW base stations may be deployed, with respect to traditional macro base stations for existing cellular communication systems. In some environments, it may not be reasonable from a cost and/or feasibility perspective, to deploy high speed wired communication links to every mmW base station. For example, not every deployment location will be suitable for a strong communication link between the mmW base station and a network entity. The mmW base stations with limited or no direct links to a network entity may, therefore, establish direct links with one or more neighboring mmW base stations to access network functionality and perform traditional backhaul operations. Such backhaul operations may require resource allocation and coordination, which can be problematic in a mmW infrastructure due to the limited (or no) access to a network entity.

According to aspects of the present description, in high frequency systems (e.g., millimeter wave communication systems), a base station may identify a need to conduct backhaul operations and coordinate resources for performing the backhaul operations via a wireless backhaul link with a neighboring base station. For example, the first base station (e.g., a mmW base station) may identify an access demand for backhaul operations, e.g., bandwidth, access time, link gain between neighboring mmW base stations, and the like. The first base station may determine access and backhaul communication parameters associated with a second base station (e.g., a neighboring mmW base station) that are based on the access demand. Accordingly, the first base station may establish a wireless backhaul link with the second base station via the mmW wireless communication system and via the communication parameters. The first base station may also partition resources between an access link with one or more UEs and the established wireless backhaul link.

In some aspects, the described techniques provide an integrated solution for resource partitioning that satisfies the access demand (e.g., based on a backhaul communication requirement) of the mmW base station as well as meets access needs for UEs operating on the mmW wireless communication system. For example, certain time slots may be partitioned for access operations, e.g., access operations by UEs as well as neighboring mmW base stations, and other time slots may be partitioned for backhaul operations by other neighboring mmW base stations.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface, in some examples, with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links. In some examples, certain base stations 105 may have no (or a limited) connection to the core network and, instead, rely on a direct wireless connection to a neighboring base station 105 to perform discovery and backhaul operations.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Wireless communications system 100 may operate in an ultra high frequency (UHF) region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter wave band (or mmW), since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support backhaul provisioning and coordination procedures for millimeter wave communications. For example, a millimeter wave base station 105 may have no (or limited) connectivity to the core network 130 and, therefore, connect with a neighboring millimeter wave base station 105 to conduct backhaul operations (e.g., the neighboring millimeter wave base station 105 may have robust connectivity to various network components). The first millimeter wave base station 105 may identify or otherwise determine an access demand associated with a second base station of the millimeter wave wireless communication system. For example, the first millimeter wave base station 105 may communicate with a UE 115 within its coverage area that has requested to access information from a remote server. The first millimeter wave base station 105 may determine communication parameters, e.g., MCS, access time, assigned bandwidth, etc., based on the access demand and associated with the second millimeter wave base station 105. The first millimeter wave base station 105 may establish a wireless backhaul link with the second millimeter wave base station 105 based on the access demand or the communication parameters. The first millimeter wave base station 105 may partition resources between an access link with one or more UEs and the established wireless backhaul link based on the access demand or the communication parameters. The wireless backhaul link may provide for conducting the backhaul operations via the millimeter wave wireless communication system.

In some examples, the first millimeter wave base station 105 may access a connection to a network entity that is also connected to the second millimeter wave base station 105. The network entity may determine, monitor, facilitate, etc., the provisioning of resources for the first and second base stations 105 to conduct the backhaul operations. In some examples, the first millimeter wave base station 105 may contact the second millimeter wave base station 105 directly to coordinate the resource provisioning. For example, the first millimeter wave base station 105 may know, a priori, a propagation attribute, e.g., a beamform direction towards the second base station, certain timing information, e.g., beacon signal transmission sequencing information, frame timing information, etc., associated with the second millimeter wave base station 105. The first millimeter wave base station 105 may use this information to contact the second millimeter wave base station 105 directly and provide information indicative of its access demand for backhaul operations. The second millimeter wave base station 105 may provision resources for conducting the backhaul operations and provide the communication parameters associated with the provisioned resources to the first base station. In some examples, neighboring millimeter wave base stations 105 may exchange information associated with the access demand to provide coordinated resource provisioning between the base stations.

Figure 2:
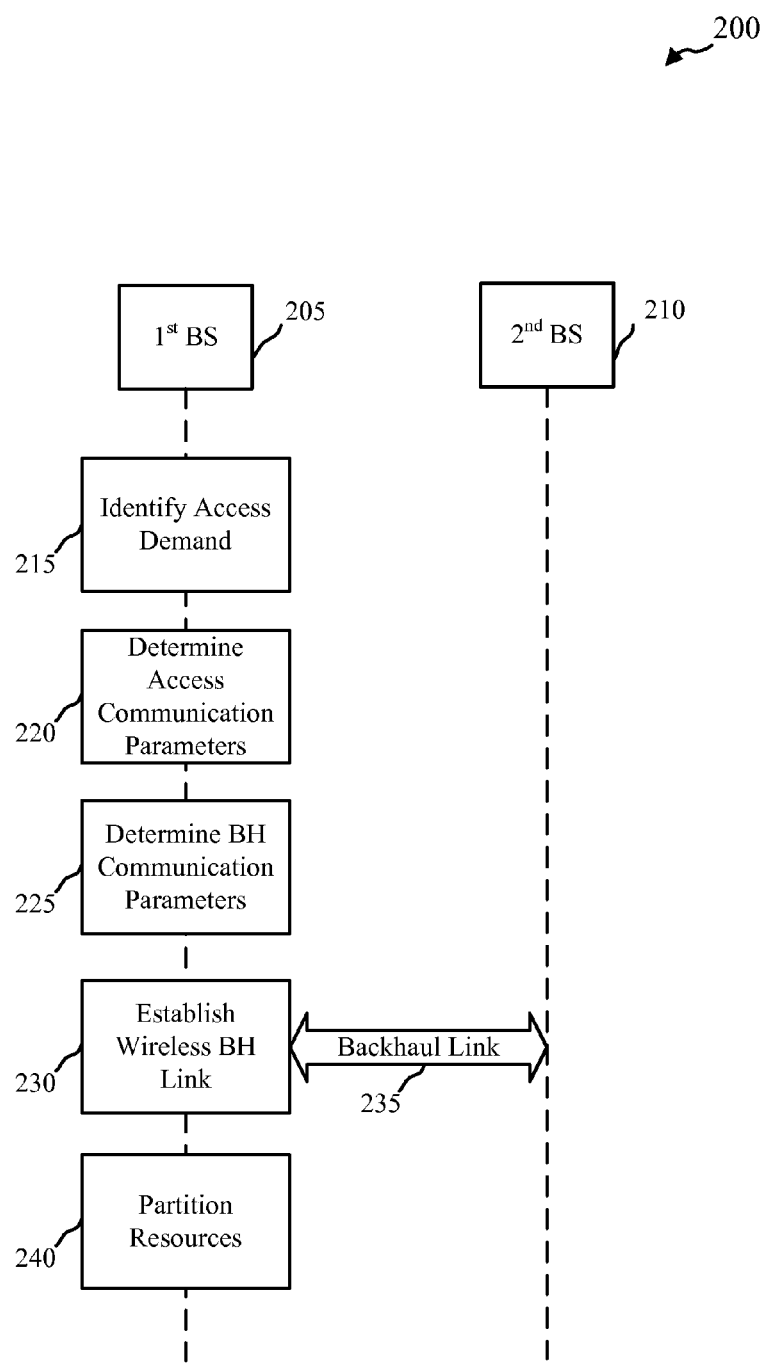
FIG. 2 shows a swim diagram illustrating aspects of backhaul operations in wireless communication, in accordance with various aspects of the present disclosure.

FIG. 2 is a swim diagram 200 illustrating aspects of backhaul operations, in accordance with various aspects of the present disclosure. The diagram 200 may illustrate aspects of the system 100 described with reference to FIG. 1. The diagram 200 includes a first millimeter wave (mmW) base station 205 and a second mmW base station 210. The first mmW base station 205 and/or the second mmW base station 210 may be examples of one or more of the base stations 105 described above with respect to FIG. 1. Generally, the diagram 200 illustrates aspects of implementing backhaul operation coordination and provisioning in millimeter wave communication systems. In some examples, a system device, such as one of the base stations 105 may execute one or more sets of codes to control the functional elements of the device to perform some or all of the functions described below.

At block 215, the first mmW base station 205 may identify an access demand. For example, the access demand may be associated with a backhaul requirement of the first mmW base station 205. Generally, the access demand may be indicative of the resources the first mmW base station 205 may use to perform the backhaul operations. For example, a large access demand may utilize more resources, e.g., over-the-air resources, than a small access demand. Example access demands may include, but are not limited to, a required access time slot, link gain parameters, bandwidth requirements, requested MCS schemes, etc. As can be appreciated, certain backhaul operations may be associated with a more robust access demand than other backhaul operations.

At block 220, the first mmW base station 205 may determine access communication parameters based on the access demand and associated with the second mmW base station 210. At block 225, the first mmW base station 205 may determine backhaul communication parameters based on the access demand and associated with the second mmW base station 210. The communication parameters may include an access time slot, link gain attributes, bandwidth assignments, assigned MCS schemes, etc. Accordingly, the second mmW base station 210 may provision resources to permit the first mmW base station 205 to conduct the backhaul operations, where the communication parameters are associated with the provisioned resources, e.g., the communication parameters are based on the provisioned resources.

In some examples, the first mmW base station 205 may send information indicative of the access demand to the second mmW base station 210 wirelessly via the mmW wireless communication system. For example, the first mmW base station 205 may support contacting the second mmW base station 210 directly, e.g., may know, a priori, a beamform direction, certain timing attributes, etc., associated with the second mmW base station 210. The first mmW base station 205 may use the information to contact the second mmW base station 210 to convey the information indicative of its access demand. The second mmW base station 210 may schedule and assign resources for the first mmW base station 205 and respond by sending the access and backhaul communication parameters to the first mmW base station 205. Examples of the access communication parameters may include one or more of an access time slot associated with the wireless access link, or a time frequency block associated with the wireless access link. Examples of the backhaul communication parameters may include one or more of an access timeslot associated with the wireless backhaul link, or a time frequency block associated with the wireless backhaul link, or a beamforming parameter associated with the wireless backhaul link, or a modulation-and-coding scheme (MCS) associated with the wireless backhaul link.

At block 230, the first mmW base station 205 may establish a wireless backhaul link 235 with the second mmW base station 210 via the mmW wireless communication system. The wireless backhaul link 235 may be established using the communication parameters and may provide sufficient resources for the first mmW base station 205 to meet its backhaul requirements. At block 240, the first mmW base station 205 may partition resources between an access link with one or more UEs and backhaul link 235 based on the access demand or the communication parameters.

Figure 3:
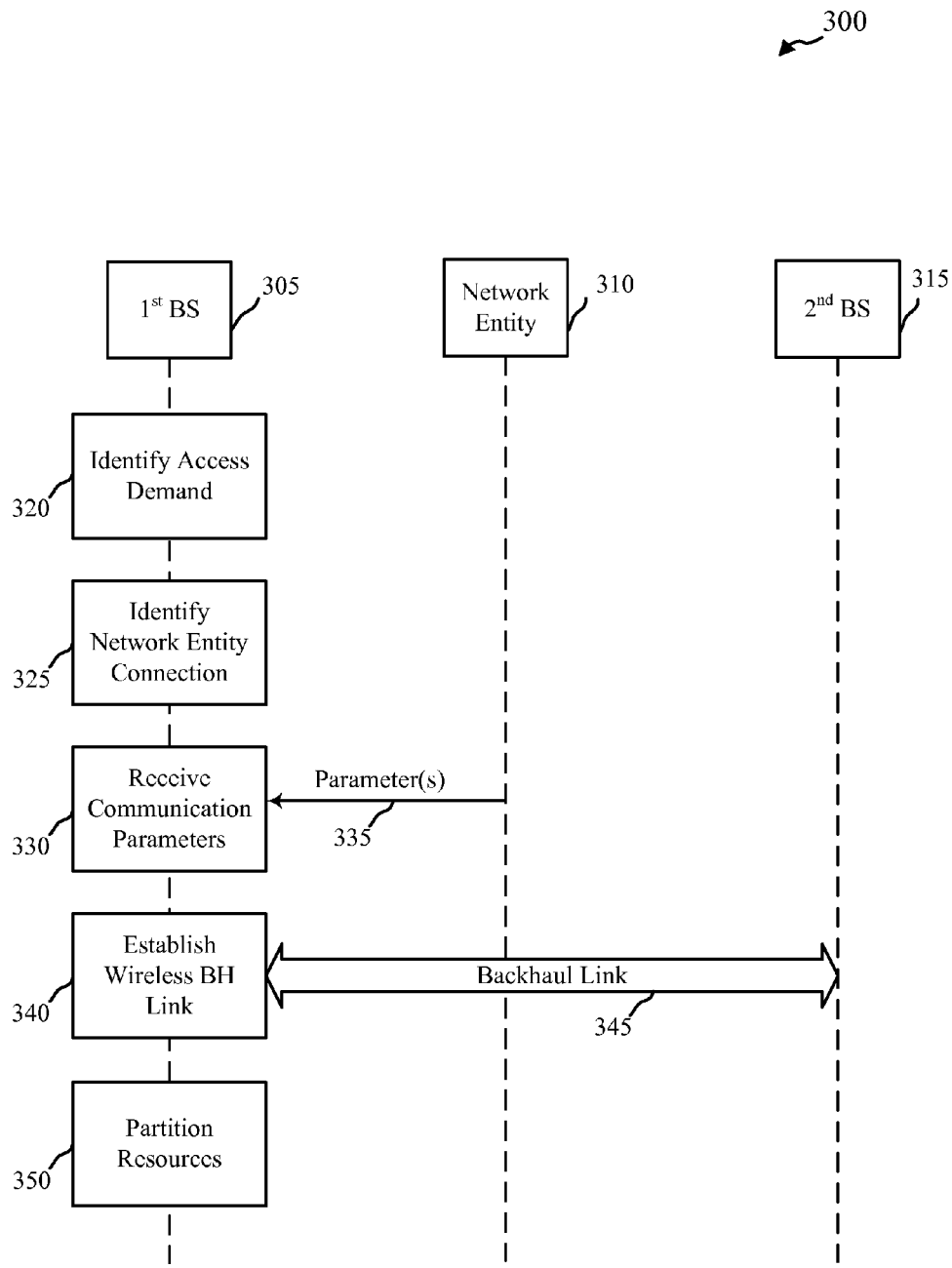
FIG. 3 shows a swim diagram illustrating aspects of backhaul operations in wireless communication, in accordance with various aspects of the present disclosure.

FIG. 3 is a swim diagram 300 illustrating aspects of backhaul operations, in accordance with various aspects of the present disclosure. The diagram 300 may illustrate aspects of the system 100 described with reference to FIG. 1. The diagram 300 includes a first millimeter wave (mmW) base station 305, a network entity 310, and a second mmW base station 315. The first mmW base station 305 and/or the second mmW base station 315 may be examples of one or more of the base stations 105 described above with respect to FIG. 1. The network entity 310 may be an example of the core network 130 described above with respect to FIG. 1. Generally, the diagram 300 illustrates aspects of implementing network assisted backhaul coordination and provisioning operations in millimeter wave communication systems. In some examples, a system device, such as one of the base stations 105 may execute one or more sets of codes to control the functional elements of the device to perform some or all of the functions described below.

At block 320, the first mmW base station 305 may identify an access demand. For example, the access demand may be associated with a backhaul requirement of the first mmW base station 305. Generally, the access demand may be indicative of the resources the first mmW base station 305 may use to perform the backhaul operations. For example, a large access demand may utilize more resources, e.g., over-the-air resources, than a small access demand.

At block 325, the first mmW base station 305 may identify a connection with the network entity 310. The connection may be a direct connection to the network entity 310 and/or an indirect connection via a third mmW base station (not shown). For a direct connection, the first mmW base station 305 may, in some examples, have a limited connection that supports minimal data communications, e.g., via a low bandwidth connection and/or a restricted connection. The first mmW base station 305 may identify the connection with the network entity 310 that is also connected to the second mmW base station 315. The first mmW base station 305 may be connected to the network entity via a wired connection, a wireless connection, or combinations thereof.

At block 330, the first mmW base station 305 may receive communication parameters 335 (e.g., access or backhaul communication parameters) from the network entity 310. In some examples, the first mmW base station 305 may send a message to the network entity 310 including information indicative of the access demand. The network entity 310 may schedule one or more resources of the first and/or second mmW base stations 305 and 315, respectively, associated with conducting the backhaul operations. The network entity 310 may send communication parameters associated with the provisioned resources to the first mmW base station 305.

In some examples, the network entity 310 may facilitate the provisioning and coordination of such resources, e.g., the network entity 310 may send a message to the second mmW base station 315 indicating the access demand of the first mmW base station 305. The second mmW base station 315 may respond to the network entity 310 including the communication parameters selected based on the access demand. The network entity 310 may then send the communication parameters to the first mmW base station 305.

Example communication parameters may include, but are not limited to, an access timeslot associated with the wireless backhaul link, or a time frequency block associated with the wireless backhaul link, or a beamforming parameter associated with the wireless backhaul link, or a modulation-and-coding scheme (MCS) associated with the wireless backhaul link, or a combination of one or more of the above.

At block 340, the first mmW base station 305 may establish a wireless backhaul link 345 with the second mmW base station 315 via the mmW wireless communication system. The wireless backhaul link 345 may be established using the communication parameters and may provide sufficient resources for the first mmW base station 305 to meet or satisfy its backhaul requirements. The first mmW base station 305 may conduct the backhaul operations with the second mmW base station 315 via the wireless backhaul link 345 over the mmW wireless communication system. At block 350, the first mmW base station 305 may partition resources between an access link with one or more UEs and backhaul link 345 based on the access demand or the communication parameters.

Figure 4:
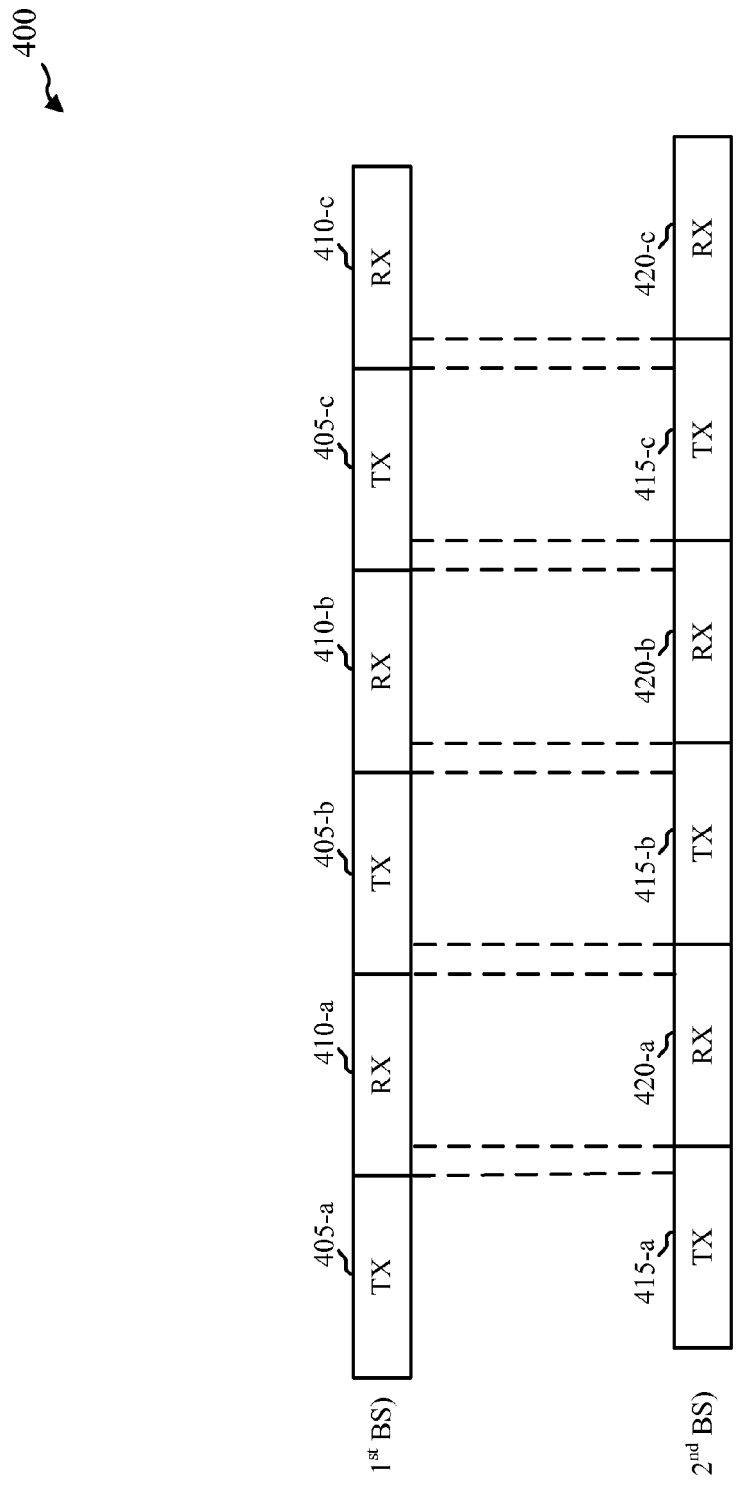
FIG. 4 shows a diagram of aspects of an example of resource allocation scheme for backhaul operations in wireless communication, in accordance with various aspects of the present disclosure.

FIG. 4 shows a diagram 400 of aspects of an example provisioning scheme associated with backhaul operations in wireless communication, in accordance with various aspects of the present disclosure. The diagram 400 may illustrate aspects of the system 100 described with reference to FIG. 1. Generally, diagram 400 illustrates an example of one or more aspects of resource provisioning between a first mmW base station and a second, neighboring mmW base station. In some examples, system devices, such as one or more mmW base stations, such as base stations 105, first mmW base stations 205 and/or 305, described with reference to FIGS. 1, 2, and/or 3, may execute one or more sets of codes to control the functional elements of the device to perform some or all of the functions illustrated with respect to diagram 400.

Typical half-duplex communication procedures between a mmW base station and UEs within its coverage area may include periods of transmitting signals to the UEs followed by periods of receiving signals from the UEs. For example, the first base mmW station may transmit one or more signals during a transmit period 405 and then typically listen (or monitor) for responses from the UEs during a receive period 410. Similarly, the second mmW base station sends its own transmissions during transmit periods 415 and then monitors for signals received from UEs during receive periods 420.

As shown in diagram 400, mmW base stations may compose a sequence of transmit, receive (TX, RX) and receive, transmit (RX, TX) pairs in consecutive frames. In some examples, the (TX, RX) pair may represent a time slot for transmitting information about its own state, followed by a slot for receiving information from other stations. The mmW base stations may create pattern tables of schedules associated with the initial signaling schemes. In some cases, the mmW base stations may use the tables to determine a schedule to achieve low latency.

In some examples, mmW base stations may provision certain resources to support communications with other, neighboring mmW base stations. In the example shown in diagram 400, each of the mmW base stations may provision time resources to support inter-mmW base station communications. For example, the first mmW base station may schedule at least a portion of its transmit period 405 and/or its receive period 410 such that it can communicate with the second mmW base station. Similarly, the second mmW base station may also schedule at least a portion of its transmit period 415 and/or its receive period 420 such that it can communicate with the first mmW base station. In some examples, the first and second mmW base stations may coordinate such scheduling, e.g., by sharing timing attributes, etc., directly. In other examples, a network entity may schedule various timing aspects for the first and second mmW base stations to support such overlaps in transmit and receive periods.

As shown in diagram 400, the first mmW base station may schedule receive period 410-$a$ such that it at least partially overlaps with the transmit period 415-$a$ of the second mmW base station. The first mmW base station may also schedule transmit period 405-$b$ such that it at least partially overlaps with receive period 420-$a$ of the second mmW base station. In some examples, the first and second mmW base stations may leverage aspects of the overlapping periods to perform backhaul operations and/or coordinate additional communication parameters for performing the backhaul operations.

According to certain aspects, the periodicity of such time resource provisioning may be relatively low. For example, the mmW base stations may minimize the overlapping periods for only a short duration, or at a periodicity at or below a threshold level, to provide sufficient access opportunities for the UEs within their respective coverage areas.

In some examples, the first and/or second mmW base stations may know, a priori, various beamforming attributes for communicating with each other. Accordingly, the mmW base stations may utilize the beamforming attributes in combination with the timing overlap period information to communicate.

Figure 5:
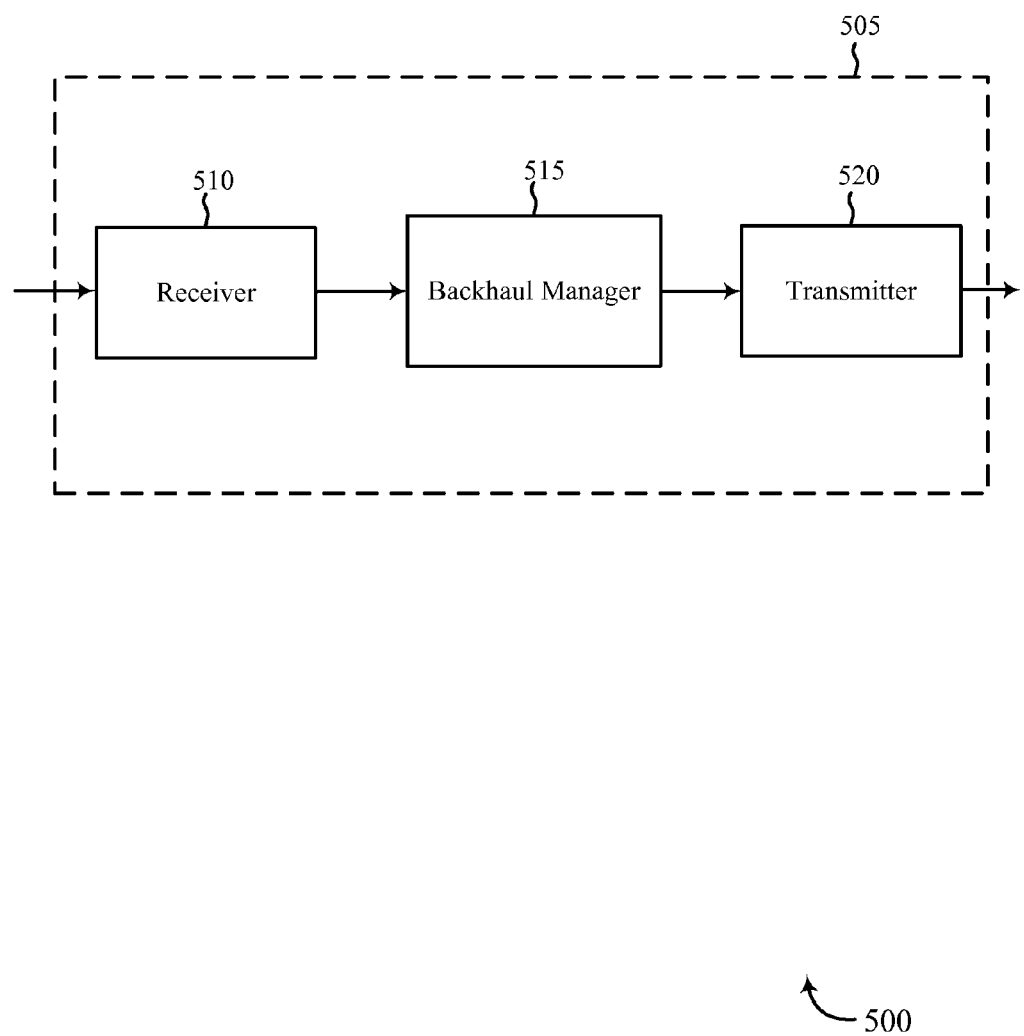
FIG. 5 shows a block diagram of an apparatus for use in wireless communication, in accordance with various aspects of the present disclosure.

FIG. 5 shows a block diagram 500 of an apparatus 505 for use in wireless communication, in accordance with various aspects of the present disclosure. In some examples, the apparatus 505 may be an example of aspects of one or more of the base stations 105, 205, and/or 305 described with reference to FIGS. 1, 2, and 3, respectively. In some examples, the apparatus 505 may be part or include an LTE/LTE-A eNB and/or an LTE/LTE-A base station. The apparatus 505 may be a base station operating in a mmW wireless communication system. The apparatus 505 may also be a processor. The apparatus 505 may include a receiver 510, a backhaul manager 515, and/or a transmitter 520. Each of these modules may be in communication with each other.

The components of the apparatus 505 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver 510 may include at least one radio frequency (RF) receiver, such as an RF receiver operable to receive one or more messages associated with backhaul operations for the apparatus 505. The receiver 510 may be used to receive various types of data and/or control signals (i.e., transmissions) over one or more communication links of a wireless communication system, such as one or more communication links of the wireless communications system 100 described with reference to FIG. 1.

In some examples, the transmitter 520 may include at least one RF transmitter, such as at least one RF transmitter operable to transmit one or more messages associated with backhaul operations for the apparatus 505. The transmitter 520 may be used to transmit various types of data and/or control signals (i.e., transmissions) over one or more communication links of a wireless communication system, such as one or more communication links of the wireless communications system 100 described with reference to FIG. 1.

In some examples, the backhaul manager 515 may monitor, control, or otherwise manage one or more aspects of backhaul operations for the apparatus 505. For example, the apparatus 505 may be a mmW base station that has identified an access demand or need to conduct backhaul operations via a second, neighboring mmW base station. The backhaul manager 515 may identify an access demand. The access demand may be associated with a demand of the apparatus 505 for backhaul operations, e.g., may be indicative of an amount, type, quantity, etc., of resources that may be needed to complete the backhaul operational requirement. The backhaul manager 515 may determine one or more communication parameters associated with a second mmW base station based, at least in certain aspects, on the access demand. For example, the communication parameters may be associated with or otherwise identify the resources that have been assigned to the apparatus 505 to perform the backhaul operations. The backhaul manager 515 may establish a wireless backhaul link with the second mmW base station based on the access demand or the communication parameters and over the mmW wireless communication system. The backhaul manager 515 may partition resources between an access link with one or more UEs and the established wireless backhaul link based on the access demand or the communication parameters. The apparatus 505 may perform the backhaul operations over the wireless backhaul link with the second mmW base station.

Figure 6:
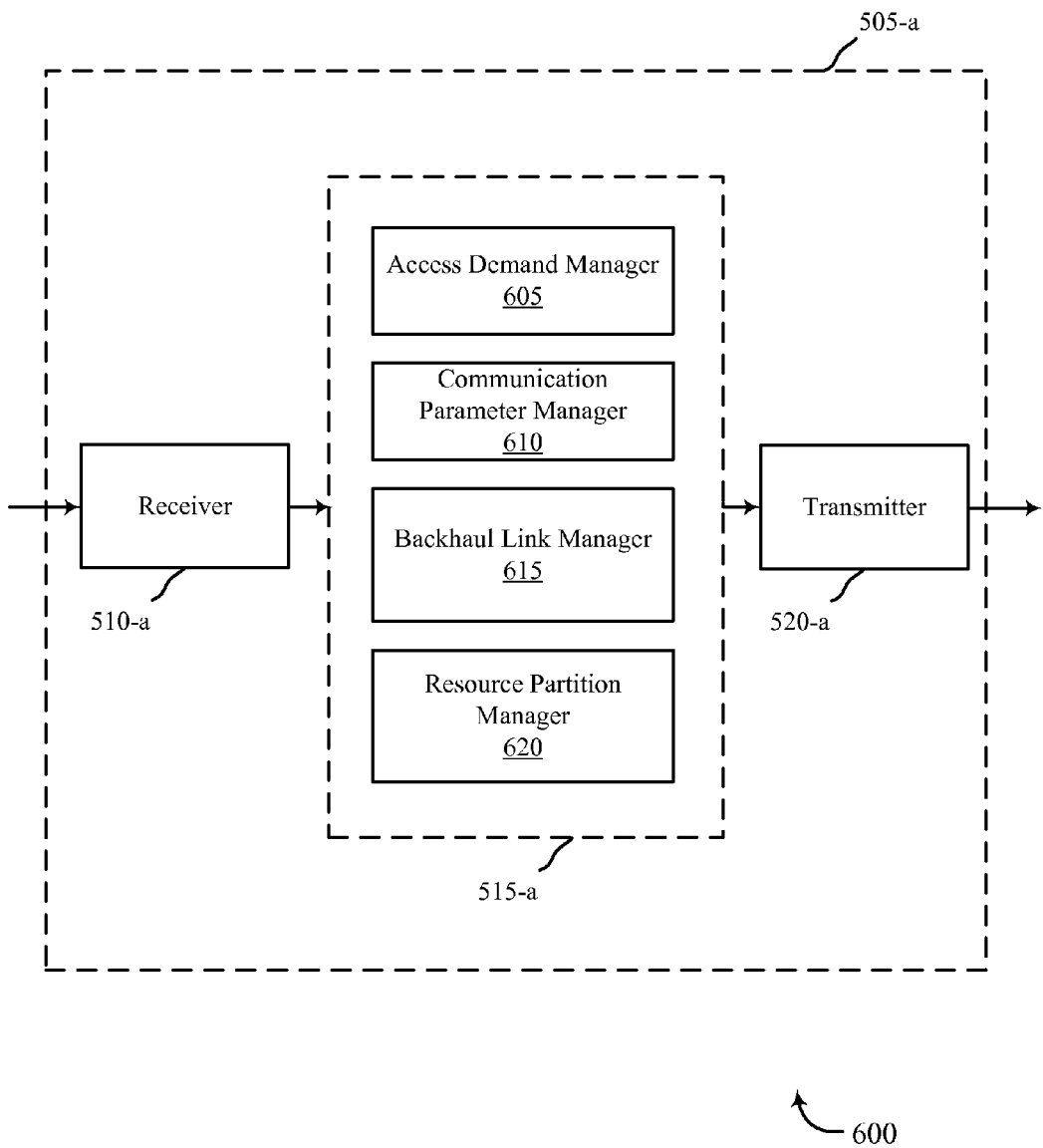
FIG. 6 shows a block diagram of an apparatus for use in wireless communication, in accordance with various aspects of the present disclosure.

FIG. 6 shows a block diagram 600 of an apparatus 505-a for use in wireless communication, in accordance with various aspects of the present disclosure. In some examples, the apparatus 505-a may be an example of aspects of one or more of the base stations 105, 205, and/or 305 described with reference to FIGS. 1, 2, and 3, respectively. In some examples, the apparatus 505-a may be an example of the apparatus 505 described with reference to FIG. 5. In some examples, the apparatus 505-a may be part or include an LTE/LTE-A eNB and/or an LTE/LTE-A base station. The apparatus 505-a may be a base station operating in a mmW wireless communication system. The apparatus 505-a may also be a processor. The apparatus 505-a may include a receiver 510-a, a backhaul manager 515-a, and/or a transmitter 520-a. Each of these modules may be in communication with each other. The receiver 510-a and the transmitter 520-a may be examples of and perform the functions of the receiver 510 and the transmitter 520, respectively, described with reference to FIG. 5. In some examples, the backhaul manager 515-a may be an example of the backhaul manager 515 described with reference to FIG. 5 and may include an access demand manager 605, a communication parameter manager 610, a backhaul link manager 615, and/or a resource partition manager 620.

In some examples, the access demand manager 605 may monitor, control, or otherwise manage aspects of determining an access demand for the apparatus 505-a. For example, the backhaul communication parameters may be associated with a requirement or need for the apparatus 505-a to conduct backhaul operations. Generally, the access demand may be indicative of a type, quantity, schedule, etc., for resources needed or that may be used by the apparatus 505-a to conduct the backhaul operations. The access demand manager 605 may output information indicative of the access demand to one or more other components of the apparatus 505-a.

In some examples, the communication parameter manager 610 may monitor, control, or otherwise manage one or more aspects of determining access and backhaul communication parameters associated with a second, neighboring mmW base station and based on the access demand. Generally, the communication parameters may be associated with or otherwise indicative of resources assigned or provisioned by the second mmW base station to the apparatus 505-a to conduct the backhaul operations. Examples of communication parameters may include, but are not limited to, one or a combination of a timeslot associated with the wireless access link, a time frequency block associated with the wireless access link, a timeslot associated with the wireless backhaul link, a time frequency block associated with the wireless backhaul link, a beamforming parameter associated with the wireless backhaul link, a modulation-and-coding scheme (MCS) associated with the wireless backhaul link, and the like.

In some examples, the communication parameter manager 610 may identify a network entity in communication with the apparatus 505-a and the second mmW base station. In some examples, the network entity may be connected to the apparatus 505-a via a wired communication link, e.g., Ethernet link. Additionally or alternatively, the network entity may be connected to the apparatus 505-a via an intermediary mmW base station, e.g., via a wireless communication link associated with a third mmW base station. Accordingly, the communication parameter manager 610 may send information to the network entity indicative of the access demand. The communication parameter manager 610 may receive information from the network entity indicative of one, or more than one of the communication parameters. The communication parameters received from the network entity may be based on the access demand.

In some examples, the communication parameter manager 610 may determine at least a portion of the communication parameters by communicating directly with the second mmW base station. For example, the communication parameter manager 610 may establish an initial communication link with the second mmW base station using a beamforming direction, a timing attribute, etc., associated with the second mmW base station and known beforehand by the apparatus 505-*a*. In some examples, the communication parameter manager 610 may utilize one or more overlapping transmit period/receive period configuration, such as is described with respect to FIG. 4, to establish an initial communication with the second mmW base station. The communication parameter manager 610 may send information indicative of the access demand to the second mmW base station wirelessly via the mmW wireless communication system. The second mmW base station may coordinate, e.g., schedule, assign, provision, and the like, one or more communication resources to support the access demand of the apparatus 505-*a* and respond by sending at least a portion of the communication parameters to the apparatus 505-*a*.

In some examples, the communication parameter manager 610 may determine the (or at least a portion of) the communication parameters using a third mmW base station. For example, the communication parameter manager 610 may identify the third mmW base station that is in communication with the apparatus 505-*a* as well as the second mmW base station. Accordingly, a message may be sent to the third mmW base station including information indicative of the access demand. The third mmW base station may schedule and/or facilitate resource scheduling of the second mmW base station. The third mmW base station may respond by sending information indicative of the communication parameters to the apparatus 505-*a*.

The backhaul link manager 615 may monitor, control, or otherwise manage aspects of establishing a backhaul link for the apparatus 505-*a*. For example, the backhaul link manager 615 may establish a wireless backhaul link with the second mmW base station based on the access demand or the communication parameters over the mmW wireless communication system. Accordingly, the apparatus 505-*a* may conduct the backhaul operations over the wireless backhaul link.

The resource partition manager 620 may monitor, control, or otherwise manage aspects of partitioning resources between an access link with one or more UEs and the backhaul link based on the access demand or the communication parameters for the apparatus 505-*a*.

As can be appreciated, in some examples the apparatus 505-*a* may support backhaul operation resource provisioning and scheduling for the second mmW base station. For example, the apparatus 505-*a* may receive a message from the second mmW base station conveying an indication of a second mmW base station access demand. The apparatus 505-*a* may schedule, provision, assign, etc., communication resources based on the second base station access demand. The apparatus 505-*a* may send a message to the second mmW base station including information indicative of communication parameters associated with the apparatus 505-*a*, e.g., the communication parameters associated with the assigned communication resources. Accordingly, the apparatus 505-*a* may establish a wireless backhaul link with the second mmW base station based on the conveyed communication parameters and over the mmW wireless communication system.

Figure 7:
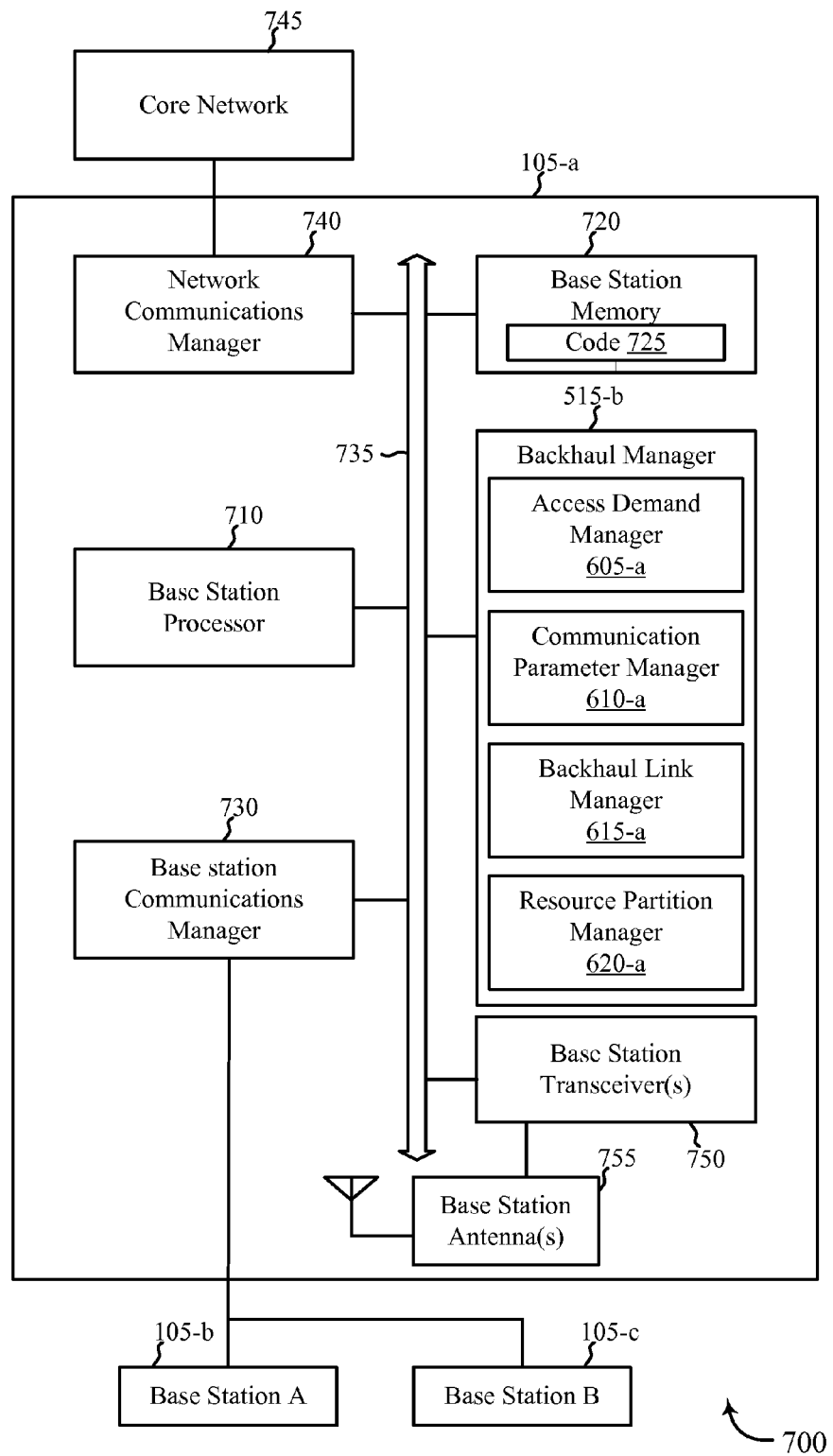
FIG. 7 shows a block diagram of a base station (e.g., a base station forming part or all of an eNB) for use in wireless communication, in accordance with various aspects of the present disclosure.

FIG. 7 shows a block diagram 700 of a base station 105-*a* (e.g., a base station forming part or all of an eNB) for use in wireless communication, in accordance with various aspects of the present disclosure. In some examples, the base station 105-*a* may be an example of aspects of one or more of the base stations 105 described with reference to FIG. 1, aspects of one or more of the first base stations 205, and 305, described with reference to FIGS. 2 and 3, respectively, and/or aspects of one or more of the apparatus 505 when configured as a base station, as described with reference to FIGS. 5 and/or 6. The base station 105-*a* may be configured to implement or facilitate at least some of the base station and/or apparatus features and functions described with reference to FIGS. 1-6.

The base station 105-*a* may include a base station processor 710, a base station memory 720, at least one base station transceiver (represented by base station transceiver 750), at least one base station antenna (represented by base station antenna(s) 755), and/or a backhaul manager 515-*b*. The base station 105-*a* may also include one or more of a base station communications manager 730 and/or a network communications manager 740. Each of these modules may be in communication with each other, directly or indirectly, over one or more buses 735.

The base station memory 720 may include random access memory (RAM) and/or read-only memory (ROM). The base station memory 720 may store computer-readable, computer-executable software/firmware code 725 containing instructions that are configured to, when executed, cause the base station processor 710 to perform various functions described herein related to wireless communication (e.g., to perform backhaul operations in a millimeter wave wireless communication system, etc.). Alternatively, the computer-readable, computer-executable software/firmware code 725 may not be directly executable by the base station processor 710 but be configured to cause the base station 105-*a* (e.g., when compiled and executed) to perform various of the functions described herein.

The base station processor 710 may include an intelligent hardware device, e.g., a central processing unit (CPU), a microcontroller, an ASIC, etc. The base station processor 710 may process information received through the base station transceiver 750, the base station communications manager 730, and/or the network communications manager 740. The base station processor 710 may also process information to be sent to the base station transceiver 750 for transmission through the antenna(s) 755, to the base station communications manager 730, for transmission to one or more other base stations 105-*b* and 105-*c*, and/or to the network communications manager 740 for transmission to a core network 745, which may be an example of one or more aspects of the core network 130 described with reference to FIG. 1. The base station processor 710 may handle, alone or in connection with the backhaul manager 515-*b*, various aspects of discovery procedures for the base station 105-*a*.

The base station transceiver 750 may include a modem configured to modulate packets and provide the modulated packets to the base station antenna(s) 755 for transmission, and to demodulate packets received from the base station antenna(s) 755. The base station transceiver 750 may, in some examples, be implemented as one or more base station transmitter modules and one or more separate base station receiver modules. The base station transceiver 750 may support communications in a first radio frequency spectrum band and/or a second radio frequency spectrum band. The base station transceiver 750 may be configured to communicate bi-directionally, via the antenna(s) 755, with one or more UEs or apparatuses, such as one or more of the UEs 115 described with reference to FIG. 1. The base station 105-*a* may, for example, include multiple base station antennas 755 (e.g., an antenna array). The base station 105-*a* may communicate with the core network 745 through the network communications manager 740. The base station 105-*a* may also communicate with other base stations, such as the base stations 105-*b* and 105-*c*, using the base station communications manager 730.

The backhaul manager 515-*b* may be configured to perform and/or control some or all of the features and/or functions described with reference to FIGS. 1-6 related to backhaul operations for the base station 105-*a*. In some examples, the backhaul manager 515-*b* may identify an access demand of the base station 105-*a*, determine communication parameters associated with a second base station and based on the access demand, establish a wireless backhaul link with the second base station over a mmW wireless communication system, and partition resources between an access link with one or more UEs and the established backhaul link. The backhaul manager 515-*b*, or portions thereof, may include a processor, and/or some or all of the functions of the backhaul manager 515-*b* may be performed by the base station processor 710 and/or in connection with the base station processor 710. In some examples, the backhaul manager 515-*b* may be an example of the backhaul manager 515 described with reference to FIGS. 5 and/or 6. For example, the backhaul manager 515-*b* may include a access demand manager 605-*a*, a communication parameter manager 610-*a*, a backhaul link manager 615-*a*, and a resource partition manager 620-*a* which may be examples of and perform the functions of the access demand manager 605, the communication parameter manager 610, the backhaul link manager 615, and the resource partition manager 620 respectively, described with reference to FIG. 6.

Figure 8:
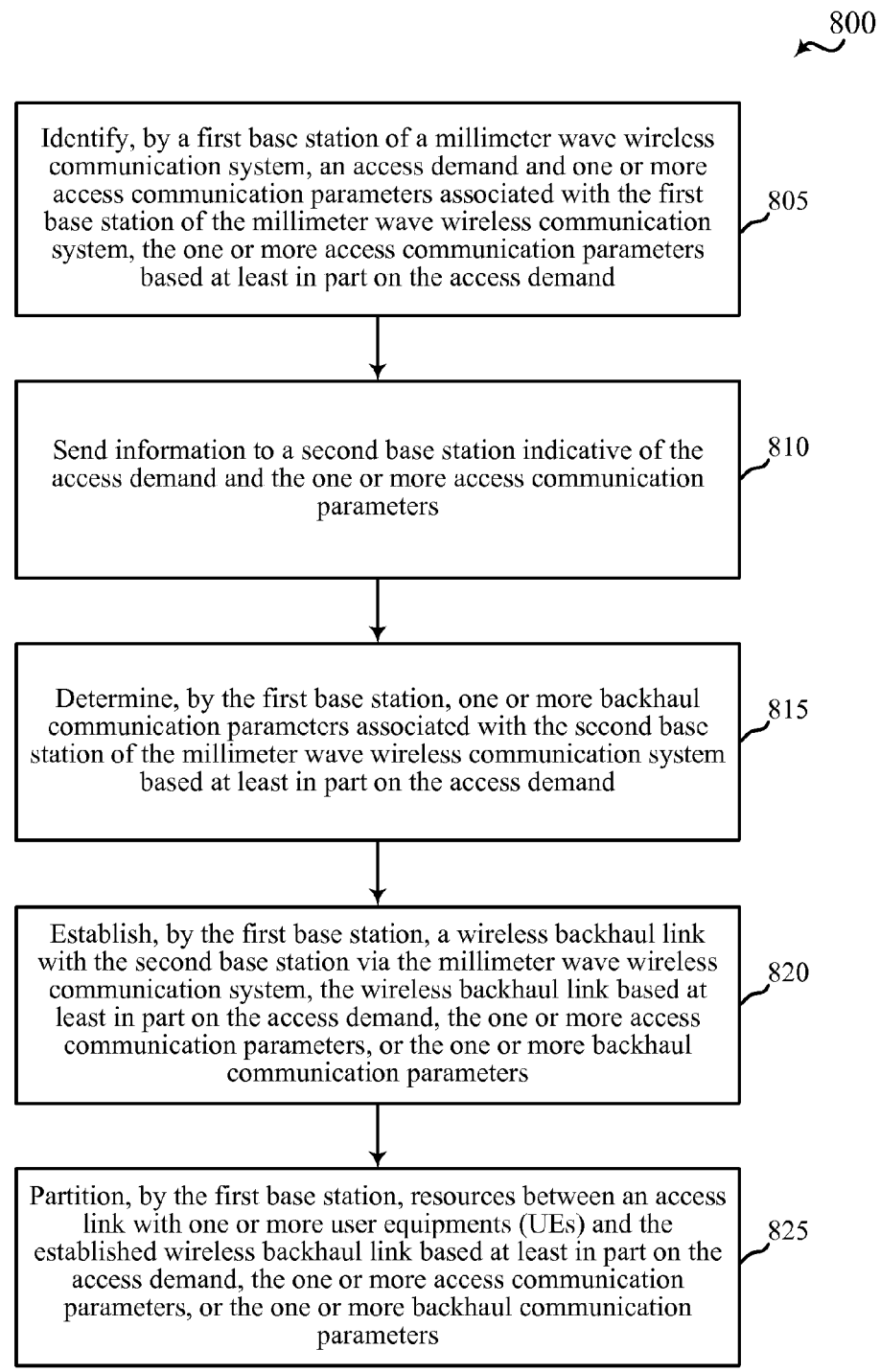
FIG. 8 is a flow chart illustrating an example of a method for wireless communication, in accordance with various aspects of the present disclosure.

FIG. 8 is a flow chart illustrating an example of a method 800 for wireless communication, in accordance with various aspects of the present disclosure. For clarity, the method 800 is described below with reference to aspects of one or more of the base stations 105, 205, 305 described with reference to FIGS. 1, 2, 3, and 7, respectively, and/or aspects of one or more of the apparatuses 505 described with reference to FIGS. 5 and 6. In some examples, a base station may execute one or more sets of codes to control the functional elements of the base station to perform the functions described below. Additionally or alternatively, the base station may perform one or more of the functions described below using special-purpose hardware.

At block 805, the method 800 may include a first base station of a mmW wireless communication system identifying an access demand and one or more access communication parameters associated with the first base station of the mmW communication system. The one or more access communication parameters may be based at least in part on the access demand. The access demand may be associated with a nature of the backhaul operational requirement of the first mmW base station, e.g., a throughput rate, a bandwidth, a timing attribute, etc. Accordingly, the access demand may be indicative of an operational need for the first mmW base station to perform backhaul operations and, in certain aspects, the nature of the backhaul operations being performed.

At block 810, the method 800 may include the first mmW base station sending information to a second base station indicative of the access demand and the one or more access communication parameters. At block 815, the first mmW base station may determine one or more access or backhaul communication parameters associated with the second mmW base station and based at least in part on the access demand. For example, the communication parameters may include a timeslot associated with the wireless access link, a time frequency block associated with the wireless access link, a timeslot associated with the wireless backhaul link, a time frequency block associated with the wireless backhaul link, a beamforming parameter associated with the wireless backhaul link, a modulation-and-coding scheme (MCS) associated with the wireless backhaul link, and the like. In certain aspects, the communication parameters may be associated with or communication resources assigned or otherwise provisioned to the first mmW base station by the second mmW base station to conduct the backhaul operations.

At block 820, the method 800 may include the first mmW base station establishing a wireless backhaul link with the second mmW base station based on the access demand or the communication parameters and over the mmW wireless communication system. The first mmW base station may conduct the backhaul operations with the second mmW base station over the wireless backhaul link.

At block 825, the method 800 may include the first mmW base station partitioning resources between an access link with one or more UEs and the established wireless backhaul link based at least in part on the access demand or the communication parameters.

The operation(s) at block 805, 810, 815, and/or 820 may be performed using the backhaul manager 515 described with reference to FIGS. 5-7.

Thus, the method 800 may provide for wireless communication. It should be noted that the method 800 is just one implementation and that the operations of the method 800 may be rearranged or otherwise modified such that other implementations are possible.

Figure 9:
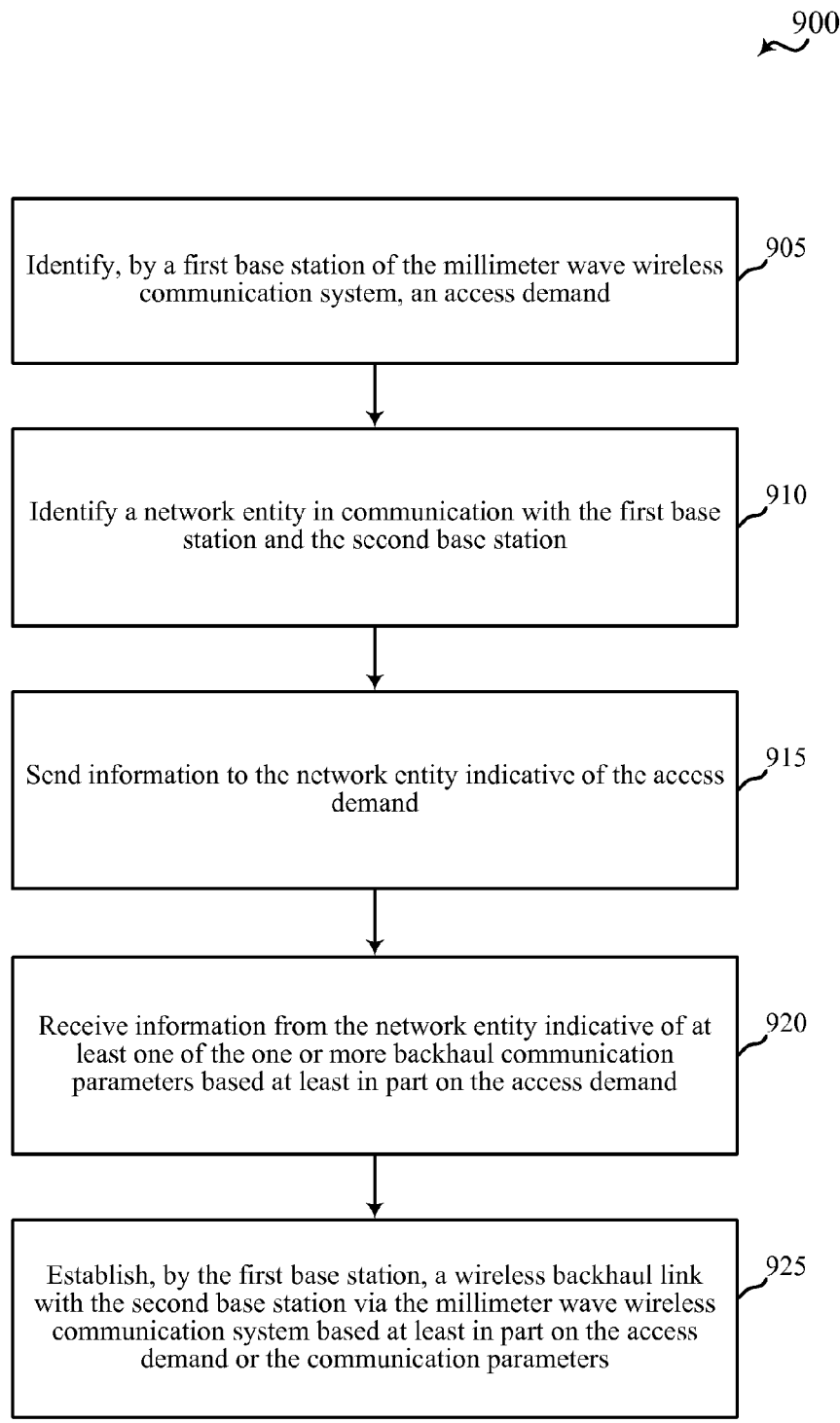
FIG. 9 is a flow chart illustrating another example of a method for wireless communication, in accordance with various aspects of the present disclosure.

FIG. 9 is a flow chart illustrating an example of a method 900 for wireless communication, in accordance with various aspects of the present disclosure. For clarity, the method 900 is described below with reference to aspects of one or more of the base stations 105, 205, 305 described with reference to FIGS. 1, 2, 3, and 7, respectively, and/or aspects of one or more of the apparatuses 505 described with reference to FIGS. 5 and 6. In some examples, a base station may execute one or more sets of codes to control the functional elements of the base station to perform the functions described below. Additionally or alternatively, the base station may perform one or more of the functions described below using special-purpose hardware.

At block 905, the method 900 may include a first base station of a mmW wireless communication system identifying an access demand. The access demand may be associated with a nature of the backhaul operational requirement of the first mmW base station, e.g., a throughput rate, a bandwidth, a timing attribute, etc. Accordingly, the access demand may be indicative of an operational need for the first mmW base station to perform backhaul operations and, in certain aspects, the nature of the backhaul operations being performed.

At block 910, the method 900 may include the first mmW base station identifying a network entity in communication with the first mmW base station and the second mmW base station, e.g., a connection to a common or shared network entity. The connection may be a direct connection, e.g., a wired connection, a wireless connection, e.g., a wireless connection via one or more neighboring mmW base stations, or combinations thereof.

At block 915, the method 900 may include the first mmW base station sending information to the network entity indicative of the access demand. For example, the first mmW base station may send a message via a wired connection, via a wireless connection through a third mmW base station, etc. The indication of the access demand may generally provide information indicating the nature, e.g., type, amount, schedule, etc., of the resources that may be allocated to conduct the backhaul operations.

At block 920, the method 900 may include the first mmW base station receiving information from the network entity indicative of at least one of one or more backhaul communication parameters associated with a second mmW base station and based at least in part on the access demand. For example, the backhaul communication parameter may include an access timeslot associated with the wireless backhaul link, a time frequency block associated with the wireless backhaul link, a beamforming parameter associated with the wireless backhaul link, a MCS associated with the wireless backhaul link, and the like. In certain aspects, the backhaul communication parameters may be associated with or communication resources assigned or otherwise provisioned to the first mmW base station by the second mmW base station to conduct the backhaul operations.

At block 925, the method 900 may include the first mmW base station establishing a wireless backhaul link with the second mmW base station based on the access demand or the communication parameters and over the mmW wireless communication system. The first mmW base station may conduct the backhaul operations with the second mmW base station over the wireless backhaul link.

The operation(s) at block 905, 910, 915, 920, and/or 925 may be performed using the backhaul manager 515 described with reference to FIGS. 5-7.

Thus, the method 900 may provide for wireless communication. It should be noted that the method 900 is just one implementation and that the operations of the method 900 may be rearranged or otherwise modified such that other implementations are possible.

Figure 10:
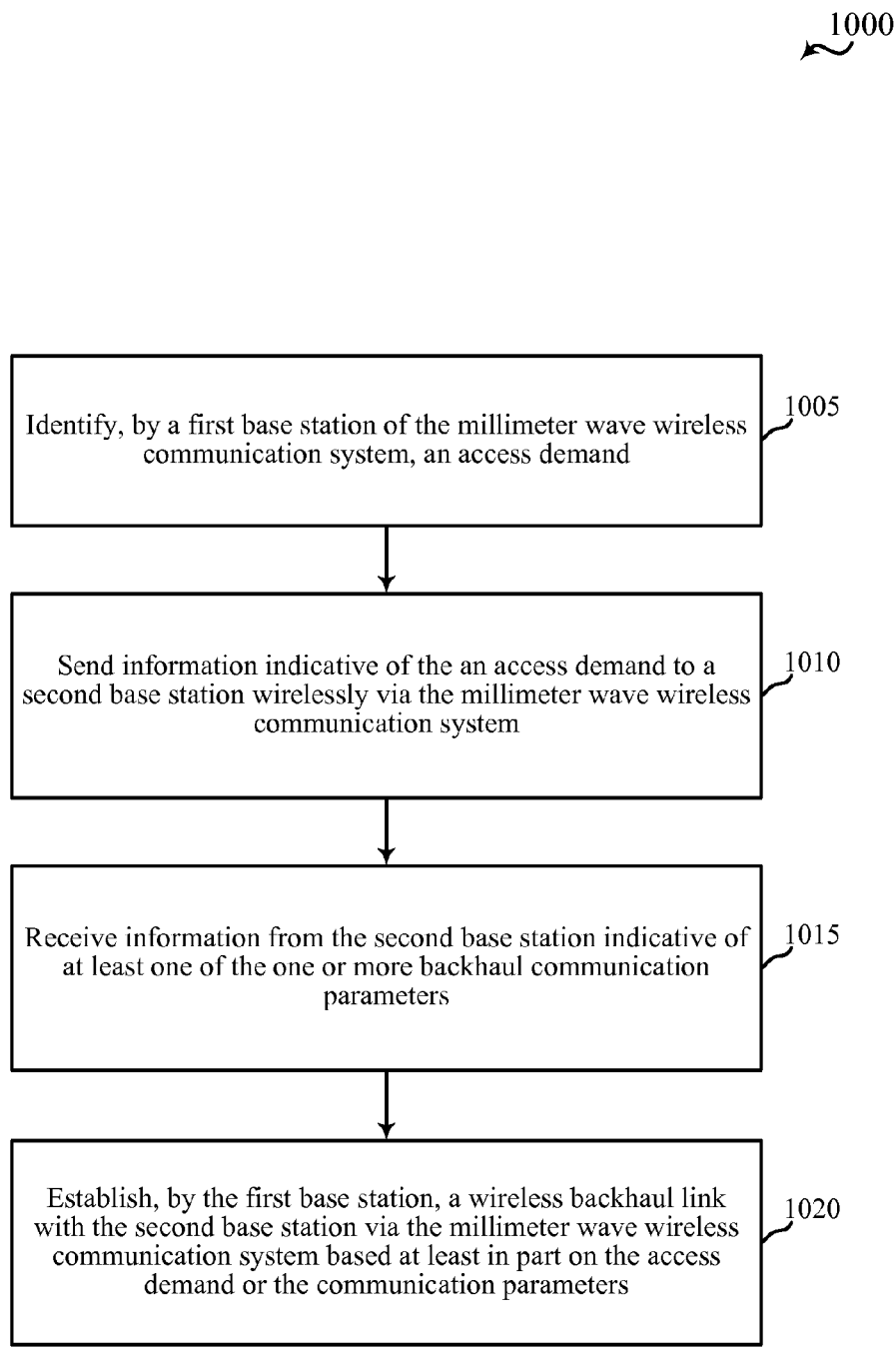
FIG. 10 is a flow chart illustrating another example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of one or more of the base stations 105, 205, 305 described with reference to FIGS. 1, 2, 3, and 7, respectively, and/or aspects of one or more of the apparatuses 505 described with reference to FIGS. 5 and 6. In some examples, a base station may execute one or more sets of codes to control the functional elements of the base station to perform the functions described below. Additionally or alternatively, the base station may perform one or more of the functions described below using special-purpose hardware.

At block 1005, the method 1000 may include a first base station of a mmW wireless communication system identifying an access demand. The access demand may be associated with a nature of the backhaul operational requirement of the first mmW base station, e.g., a throughput rate, a bandwidth, a timing attribute, etc. Accordingly, the access demand may be indicative of an operational need for the first mmW base station to perform backhaul operations and, in certain aspects, the nature of the backhaul operations being performed.

At block 1010, the method 1000 may include the first mmW base station sending information indicative of the access demand to a second mmW base station wirelessly via the mmW wireless communication system. For example, the first mmW base station may know directional, timing, etc., attributes associated with the second mmW base station utilized to send the indication of the access demand.

At block 1015, the method 1000 may include the first mmW base station receiving from the second mmW base station an indication of one or more backhaul communication parameters associated with a second mmW base station and based at least in part on the access demand. In certain aspects, the backhaul communication parameters may be associated with or communication resources assigned or otherwise provisioned to the first mmW base station by the second mmW base station to conduct the backhaul operations.

At block 1020, the method 1000 may include the first mmW base station establishing a wireless backhaul link with the second mmW base station based on the access demand or the communication parameters and over the mmW wireless communication system. The first mmW base station may conduct the backhaul operations with the second mmW base station over the wireless backhaul link.

The operation(s) at block 1005, 1010, 1015, and/or 1020 may be performed using the backhaul manager 515 described with reference to FIGS. 5-7.

Thus, the method 1000 may provide for wireless communication. It should be noted that the method 1000 is just one implementation and that the operations of the method 1000 may be rearranged or otherwise modified such that other implementations are possible.

In some examples, aspects from two or more of the methods 800, 900, 1000 may be combined. It should be noted that the methods 800, etc. are just example implementations, and that the operations of the methods 800-1000 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication in a millimeter wave wireless communication system, comprising:
   identifying, by a first base station of the millimeter wave wireless communication system, an access demand and one or more access communication parameters associated with the first base station of the millimeter wave wireless communication system, the one or more access communication parameters based at least in part on the access demand;
   sending information to a second base station indicative of the access demand and the one or more access communication parameters;
   determining, by the first base station, one or more backhaul communication parameters associated with the second base station of the millimeter wave wireless communication system based at least in part on the access demand;
   establishing, by the first base station, a wireless backhaul link with the second base station via the millimeter wave wireless communication system, the wireless backhaul link based at least in part on the access demand, the one or more access communication parameters, or the one or more backhaul communication parameters; and
   partitioning, by the first base station, resources between an access link with one or more user equipments (UEs) and the established wireless backhaul link based at least in part on the access demand, the one or more access communication parameters, or the one or more backhaul communication parameters, wherein the partitioning comprises scheduling a UE transmit period of the first base station that at least partially overlaps with a UE receive period of the second base station and a UE receive period of the first base station that at least partially overlaps with a UE transmit period of the second base station, wherein the overlapping periods are used to perform backhaul operations via the wireless backhaul link.

2. The method of claim 1, further comprising:
identifying a network entity in communication with the first base station and the second base station; and
receiving information from the network entity indicative of at least one of the one or more backhaul communication parameters.

3. The method of claim 2, further comprising:
sending information to the network entity indicative of the access demand,
wherein the information received from the network entity indicative of at least one of the one or more backhaul communication parameters is based at least in part on the access demand.

4. The method of claim 2, further comprising:
receiving information from the network entity indicative of at least one of the one or more backhaul communication parameters on a periodic schedule.

5. The method of claim 2, wherein the network entity is connected to the first base station and the second base station via a wired communication link.

6. The method of claim 2, wherein the network entity is connected to the first base station and the second base station via a wireless communication link associated with a third base station of the millimeter wave wireless communication system.

7. The method of claim 1, wherein the one or more access communication parameters comprises at least one of a timeslot associated with a wireless access link, or a time frequency block associated with the wireless access link, or combinations thereof.

8. The method of claim 1, wherein the one or more backhaul communication parameters comprises at least one of a timeslot associated with the wireless backhaul link, or a time frequency block associated with the wireless backhaul link, or a beamforming parameter associated with the wireless backhaul link, or a modulation-and-coding scheme (MCS) associated with the wireless backhaul link, or combinations thereof.

9. The method of claim 1, wherein the partitioning is based on optimization techniques.

10. The method of claim 1, further comprising:
sending information indicative of the access demand to the second base station wirelessly via the millimeter wave wireless communication system; and
receiving information from the second base station indicative of at least one of the one or more backhaul communication parameters.

11. The method of claim 1, further comprising:
sending information indicative of the access demand to a third base station of the millimeter wave wireless communication system; and
receiving, from the third base station, information indicative of at least one of the one or more backhaul communication parameters associated with the second base station.

12. The method of claim 1, further comprising:
receiving a first message from the second base station conveying an indication of a second base station access demand; and
sending a second message to the second base station conveying an indication of one or more communication parameters associated with the first base station.

13. The method of claim 12, further comprising:
establishing a wireless backhaul link with the second base station based at least in part on the one or more communication parameters associated with the first base station.

14. The method of claim 1, further comprising:
identifying initial signaling schemes between the first base station and the second base station, the initial signaling schemes comprising a sequence of transmit, receive (TX, RX) and receive, transmit (RX, TX) pairs in consecutive frames, wherein the (TX, RX) pair comprises the first base station transmit period and the second base station receive period, and the (RX, TX) pair comprises the first base station receive period and the second base station transmit period.

15. The method of claim 14, wherein the (TX, RX) pair represents a time slot for transmitting information associated with a state of the first base station followed by a slot for receiving information from additional base stations.

16. The method of claim 14, further comprising:
creating pattern tables of one or more schedules associated with the initial signaling schemes.

17. The method of claim 16, further comprising:
using the pattern tables to determine a schedule to achieve low latency.

18. A first base station for wireless communication, comprising:
a processor;
memory in electronic communication with the processor; and
instructions stored in the memory, the instructions being executable by the processor to:
identify an access demand and one or more access communication parameters associated with the first base station of a millimeter wave wireless communication system, the one or more access communication parameters based at least in part on the access demand;
send information to a second base station indicative of the access demand and the one or more access communication parameters;
determine one or more backhaul communication parameters associated with the second base station of the millimeter wave wireless communication system based at least in part on the access demand;
establish a wireless backhaul link with the second base station via the millimeter wave wireless communication system, the wireless backhaul link based at least in part on the access demand, the one or more access communication parameters, or the one or more backhaul communication parameters; and
partition resources between an access link with one or more user equipments (UEs) and the established wireless backhaul link based at least in part on the access demand, the one or more access communication parameters, or the one or more backhaul communication parameters, wherein the partitioning comprises scheduling a UE transmit period of the first base station that at least partially overlaps with a UE receive period of the second base station and a UE receive period of the first base station that at least partially overlaps with a UE transmit period of the second base station, wherein the overlapping periods are used to perform backhaul operations via the wireless backhaul link.

19. The first base station of claim 18, further comprising instructions executable by the processor to:
identify a network entity in communication with the first base station and the second base station; and
receive information from the network entity indicative of at least one of the one or more backhaul communication parameters.

20. The first base station of claim 19, further comprising instructions executable by the processor to:
send information to the network entity indicative of the access demand,
wherein the information received from the network entity indicative of at least one of the one or more backhaul communication parameters is based at least in part on the access demand.

21. The first base station of claim 19, further comprising instructions executable by the processor to:
receive information from the network entity indicative of the at least one of the one or more backhaul communication parameters on a periodic schedule.

22. The first base station of claim 19, wherein the network entity is connected to the first base station and the second base station via a wired communication link.

23. The first base station of claim 19, wherein the network entity is connected to the first base station and the second base station via a wireless communication link associated with a third base station of the millimeter wave wireless communication system.

24. The first base station of claim 18, wherein the one or more access communication parameters comprises at least one of a timeslot associated with a wireless access link, or a time frequency block associated with the wireless access link, or combinations thereof.

25. The first base station of claim 18, wherein the one or more backhaul communication parameters comprises at least one of a timeslot associated with the wireless backhaul link, or a time frequency block associated with the wireless backhaul link, or a beamforming parameter associated with the wireless backhaul link, or a modulation-and-coding scheme (MCS) associated with the wireless backhaul link, or combinations thereof.

26. The first base station of claim 18, wherein the partitioning is based on optimization techniques.

27. The first base station of claim 18, further comprising instructions executable by the processor to:
send information indicative of the access demand to the second base station wirelessly via the millimeter wave wireless communication system; and
receive information from the second base station indicative of at least one of the one or more backhaul communication parameters.

28. The first base station of claim 18, further comprising instructions executable by the processor to:
send information indicative of the access demand to a third base station of the millimeter wave wireless communication system; and
receive, from the third base station, information indicative of at least one of the one or more backhaul communication parameters associated with the second base station.

29. A first base station for wireless communication, comprising:
means for identifying, by the first base station of a millimeter wave wireless communication system, an access demand and one or more access communication parameters associated with the first base station of the millimeter wave wireless communication system, the one or more access communication parameters based at least in part on the access demand;
means for sending information to a second base station indicative of the access demand and the one or more access communication parameters;
means for determining, by the first base station, one or more backhaul communication parameters associated with the second base station of the millimeter wave wireless communication system based at least in part on the access demand;
means for establishing, by the first base station, a wireless backhaul link with the second base station via the millimeter wave wireless communication system, the wireless backhaul link based at least in part on the access demand, the one or more access communication parameters, or the one or more backhaul communication parameters; and
means for partitioning, by the first base station, resources between an access link with one or more user equipments (UEs) and the established wireless backhaul link based at least in part on the access demand, the one or more access communication parameters, or the one or more backhaul communication parameters, wherein the means for partitioning comprises means for scheduling a UE transmit period of the first base station that at least partially overlaps with a UE receive period of the second base station and a UE receive period of the first base station that at least partially overlaps with a UE transmit period of the second base station, wherein the overlapping periods are used to perform backhaul operations via the wireless backhaul link.

30. A non-transitory computer-readable medium storing computer-executable code for wireless communication, the code executable by a processor to:
identify, by a first base station of a millimeter wave wireless communication system, an access demand and one or more access communication parameters associated with the first base station of the millimeter wave wireless communication system, the one or more access communication parameters based at least in part on the access demand;
send information to a second base station indicative of the access demand and the one or more access communication parameters;
determine, by the first base station, one or more backhaul communication parameters associated with the second base station of the millimeter wave wireless communication system based at least in part on the access demand;
establish, by the first base station, a wireless backhaul link with the second base station via the millimeter wave wireless communication system, the wireless backhaul link based at least in part on the access demand, the one or more access communication parameters, or the one or more backhaul communication parameters; and
partition, by the first base station, resources between an access link with one or more user equipments (UEs) and the established wireless backhaul link based at least in part on the access demand, the one or more access communication parameters, or the one or more backhaul communication parameters, wherein the partitioning comprises scheduling a UE transmit period of the first base station that at least partially overlaps with a UE receive period of the second base station and a UE receive period of the first base station that at least partially overlaps with a UE transmit period of the second base station, wherein the overlapping periods are used to perform backhaul operations via the wireless backhaul link.

* * * * *